March 20, 1962 H. REHER ET AL 3,026,380

TRANSISTORIZED REPRODUCING AMPLIFIER CIRCUITRY HAVING FEEDBACK

Filed March 30, 1959 2 Sheets-Sheet 1

Inventors:
Helmut Reher & Hans-Günther Frerichs
By [signature] Patent Agent

March 20, 1962 H. REHER ET AL 3,026,380

TRANSISTORIZED REPRODUCING AMPLIFIER CIRCUITRY HAVING FEEDBACK

Filed March 30, 1959 2 Sheets-Sheet 2

Inventors
Helmut Reher & Hans-Günther Frerichs
By [signature]
Patent Agent

United States Patent Office 3,026,380

Patented Mar. 20, 1962

3,026,380
TRANSISTORIZED REPRODUCING AMPLIFIER CIRCUITRY HAVING FEEDBACK

Helmut Reher, Eutin, and Hans-Günther Frerichs, Hannover, Germany, assignors to Telefunken G.m.b.H., Berlin, Germany Filed Mar. 30, 1959, Ser. No. 802,801
Claims priority, application Germany Apr. 1, 1958
1 Claim. (Cl. 179—100.2)

The present invention relates to a circuit for use in magnetic tape recording apparatus and, more particularly, to a circuit utilizing transistors.

Generally, no difficulties are encountered in connecting a magnetic reading head to an electron tube amplifier. The magnetic reproducing head is connected either directly to the control grid of the first tube of the amplifier or through a grid leakage resistor and a capacitor to the control grid to create variations in the biasing potential on the tube. Because of the high input impedance of an electron tube even a magnetic reading head having a high inductance, for example 1 henry, is not loaded by the tube. This means that the head may reproduce signals essentially uniformly over the entire audio-frequency range. In addition, the fact that an electron tube may be controlled without substantial absorption of energy eliminates the use of a transformer for matching.

In contrast, the feeding of a transistor amplifier by a magnetic reproducing head results in variations in amplification over the range of frequency being reproduced, generally resulting in less amplification of the signals of high frequency, due to the comparatively large amount of current required by the transistor flowing through the internal inductance of the reproducing head. In this manner, a transistor serves to unduly load a small source of alternating current, such as a magnetic reading head. For example, assuming the reading has an inductance of, for example, 100 mh., the impedance of the head is 31.4 ohms at 50 cycles.

When compared to this, the input impedance of a transistor emitter circuit of about 5,000 ohms appears high, but at 10,000 cycles, the inductive reactance of the head becomes 6,300 ohms. From this, it can be seen that, when the impedance of the reproducing head approaches that of the input to the transistor, the amplification at the higher frequencies is reduced to about 0.7 of the gain at the lower frequencies, since the transistor requires a current flow generally in the nature of 0.5 to 0.3 ma.

The drop in amplification at the high frequency and of the audio band is extremely undesirable, particularly in view of the fact that the output from the magnetic reading head also has a tendency to drop off at the higher frequencies. It is often desirable to boost the gain of the higher frequency signals, and this can be accomplished in the case of electron tube amplifiers by providing a capacitor to tune the inductance of the reading head at the higher frequencies.

This form of compensating circuit would not be effective when the reading head feeds a transistor amplifier, due to the damping effect of the low input impedance of the transistor upon the circuit It is possible, of course, to derive a frequency compensation in the amplification of the transistor circuit by using a feedback circuit which is responsive to frequency variations, but the tuning of the reading head inductance is preferable in view of the rapid variation in amplification with frequency that is required.

It is an object of the present invention to provide a transistor amplifier for a magnetic reproducing head in which the decrease in amplification of the higher frequency signals is overcome.

It is another object of the present invention to provide a transistor amplifier for magnetic reproducing heads in which the variations in the matching with the different frequency signals are compensated by providing a feedback path from one amplifier stage to the input of the first transistor stage, said feedback becoming operative only at the higher frequencies, whereby the input impedance of the first transistor is enhanced at the higher frequencies by the feedback circuit.

In order to increase the apparent input impedance of the first transistor stage, the potential applied to the input of the first transistor must be applied in series by a series feedback path rather than in parallel to the input signals of the transistor. In electron tube amplifiers designed for tape recorder purposes, a frequency-responsive series feedback path to improve the gain at the lower and the high frequencies has been used. However, these circuits have not applied the feedback to the first stage of the amplifier, but have rather utilized the second or third stage (see the periodical "Funktechnik," 1952, pages 260 to 261).

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
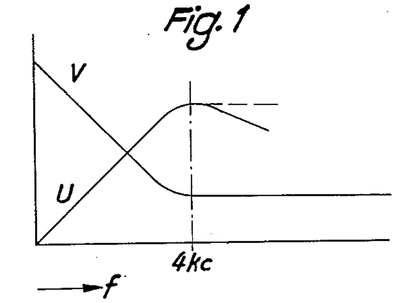
FIGURE 1 illustrates a pair of curves which represent the frequency-output amplitude characteristics of a magnetic reading head and the frequency-gain characteristics of an appropriate amplifier.

Referring in detail to the drawings and, more particularly, to FIGURE 1, the curve designated by U represents the variations with frequency in the no-load output potential from a magnetic reading head. This no-load potential gradually rises as the frequency increases, because with an increase in frequency, the time-rate-of-change of magnetic flux also increases, producing a higher induced voltage in the reading head. However, the finite dimensions of the air gap of the magnetic head soon become apparent, and a maximum no-load potential is reached, after which any increase in frequency produces a decrease in the no-load output voltage from the head.

The drooping characteristics of the output potential at the higher frequencies can be compensated by tuning the inductance of the head with a shunt capacitor producing a characteristic such as is shown by the dashed line above the drooping portion of the curve U.

To provide a uniform output from the amplifier, an amplifier having the characteristics of gain versus frequency represented by the curve V of FIGURE 1 is generally used. In such an amplifier, the gain is at a maximum at the lower frequencies and gradually decreases at approximately the same rate at which the output potential from the head rises with increases in frequency until the frequency at which the maximum output from the head is obtained. At this frequency, the gain of the amplifier flattens out and remains substantially constant throughout the rest of the frequency range.

These characteristics may be obtained by the use of shunt capacitors or by means of frequency-responsive feedback circuits, for example, circuits which become effective above, for example, 4 kilocycles.

When a frequency-responsive series feedback circuit feeding the input of the first transistor stage is used in accordance with the principles of this invention, two advantages are simultaneously achieved. For one, there is a desirable increase in the amplification of the circuit as the frequency of the signals varies to compensate for the non-linear frequency characteristic of the reading head and, for another, the series feedback signals improve the apparent input impedance of the transistor in the operative range of the feedback circuit.

This range at which the feedback circuit becomes operative may extend from 4 kilocycles upward, for example, and serves to avoid the additional drop in output potential from the magnetic reproducing head at the higher frequencies, so as to flatten the frequency output characteristic of the head, as shown by the dashed line of FIGURE 1.

Figure 2:
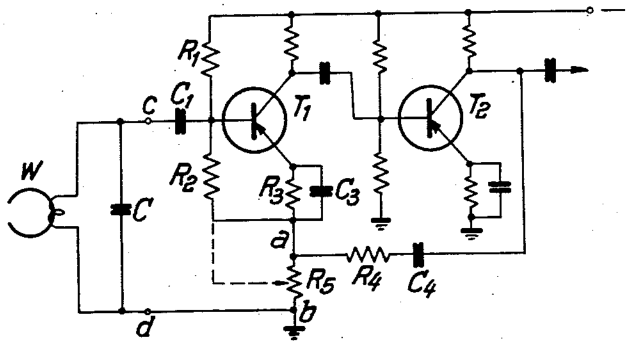
FIGURE 2 is a schematic circuit diagram of a transformerless amplifier incorporating the principles of this invention.

In the circuit of FIGURE 2, an alternating current signal is derived from the reading head W as a magnetic tape having signals recorded thereon is driven past the head. The output of the reading head W, which may have an inductance of 100 mh, for example, is connected to the base electrode of the transistor $T_1$ through a capacitor $C_1$, for example. The output of the transistor $T_1$ is taken from the collector electrode through a capacitor to the base electrode of a second amplifier stage $T_2$ for transmission to subsequent stages for further amplification. The bias placed upon the base electrode of the transistor $T_1$ is determined by a voltage divider $R_1$ and $R_2$, where the resistor $R_1$ may have a value of 100,000 ohms, for example, and the resistor $R_2$ may have a value of 30,000 ohms. A similar voltage divider is provided in the base electrode circuit of the transistor $T_2$ to bias that transistor to its proper operating point.

A second voltage divider, formed of a resistor $R_4$, having, for example, a resistance of approximately 400 ohms, and a resistor $R_5$ of, for example, 40 ohms, is connected between the collector electrode of the second transistor $T_2$ and ground. The junction between the two resistors $R_4$ and $R_5$ is connected through a parallel circuit of a resistor $R_3$, having, for example, a resistance value of 100 kilo ohms, and a capacitor $C_3$ to the emitter electrode of the transistor $T_1$, and through a resistor $R_2$ having a value of about 30,000 ohms to the base electrode of the transistor $T_1$.

A signal feedback path is provided from the collector electrode of the transistor $T_2$ through the resistor $R_4$ and the resistor $R_2$ to the base electrode of the transistor $T_1$, the feedback potential being developed across the resistor $R_5$. The resistor $R_3$, connected to the emitter electrode of transistor $T_1$, serves to stabilize the operating point of that transistor, and its parallel capacitor $C_3$ acts to bypass the higher frequency signals around the resistor $R_3$ and, thereby, serves to accentuate the lower frequency signals. The capacitor $C_4$, which is in the series feedback path and has a value of around 0.1 $\mu$f., and the resistor $R_4$ are so dimensioned that the feedback signal is low at low frequencies and increases as the frequencies increase, the mid-point falling, for example, at around 4,000 cycles. Also, the amount of feedback signal is selected so that at the higher frequencies, for example, above 4,000 cycles, the input impedance of the transistor $T_1$ is large with respect to the impedance of the reading head W. This may be accomplished by opposing the current flow from the reading head W by the feedback signal, creating an apparent high impedance into the transistor $T_1$.

By connecting the resistor $R_2$ between the base electrode of the transistor $T_1$ and the junction of the resistors $R_4$ and $R_5$, it is also made effective in the feedback circuit and serves to further increase the apparent impedance of the input to the transistor $T_1$. In this manner, in an amplifier which was constructed utilizing the principles of this invention, a total input impedance of approximately 35,000 ohms was obtained across the input to the transistor $T_1$ at frequencies above 4,000 cycles. If the resistor $R_2$ is connected between the base electrode of the transistor $T_1$ and a slide or tap on the resistor $R_5$, rather than to the junction of the resistors $R_4$ and $R_5$, the effective input impedance of the amplifier may be manually adjusted to strengthen or weaken the resonance effect of the capacitor C which is connected across the reading head W. In this manner, a desired characteristic, such as the dashed line continuation of the curve U of FIGURE 1, may be obtained.

Figure 3:
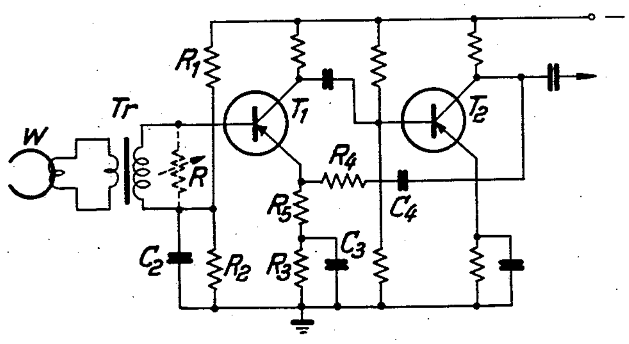
FIGURE 3 is a schematic circuit diagram of an amplifier incorporating a transformer and is a modification of the amplifier of FIGURE 2.

In the embodiment illustrated in FIGURE 3, a transformer *Tr* is interposed between the magnetic reading head W and the input to the transistor $T_1$. In this manner, a magnetic reading head having a lower inductance than that of FIGURE 2, for example an inductance of 20 mh., may be used. If the transformer has a step-up ratio of 2:9, the apparent inductance of the reading head W, as it appears at the secondary of the transformer *Tr*, is approximately 400 mh.

At the same time, the apparent input impedance of the transistor $T_1$ is affected in such a manner, that the feedback signal has a greater effect at the higher frequencies. Also, the head W is not loaded as much by the voltage divider resistors $R_1$ and $R_2$, since they are coupled to the head through the transformer *Tr*. There is no direct current flow from the amplifier circuit to the recording head W, due to the decoupling effect of the transformer *Tr* and, as a result, the damping effect of the head is decreased.

As shown in FIGURE 3, the inter-electrode capacitance of transistor $T_1$ and the distributed capacitance of the transformer *Tr*, combined, should be sufficient to resonate with the inductance of the reading head W at the higher frequencies to provide a flattening of the curve of the reading head W. In addition, the effective resistance R, which can, if needed, be connected across the secondary of the transformer *Tr* and which has a value of approximately 500,000 ohms, also serves to compensate for the drooping characteristic of the reading head output at the higher frequencies.

A capacitor $C_2$ is connected between one end of the secondary of the transformer *Tr* and ground, serving as an A.C. path therebetween. Except for the resistors $R_3$ and $R_5$ of the circuit of FIGURE 3 being reversed in position with respect to the resistors $R_3$ and $R_5$ of FIGURE 2, the remainder of the circuit illustrated in FIGURE 3 is identical to that shown in FIGURE 2.

In addition to the frequency-responsive alternating signal feedback path from the second transistor $T_2$ to the input of the first transistor $T_1$, it is also possible to simultaneously provide a direct current feedback path from the second transistor to the first to stabilize the operating points of the two transistors. If this is desired, then one end of the resistor $R_1$, instead of being connected to the negative power terminal, may be connected to the emitter-electrode of the transistor $T_2$.

The circuits illustrated in FIGURES 2 and 3 compensate for variations in matching, due to the changes in the frequency of the signal, but a drooping characteristic at the higher frequencies is still possible, due to the finite width of the gap in the reproducing head W. This becomes evident when it is realized that, at the higher frequencies, the width of the gap in the head W is of the order of a wave length recorded on the tape. By tuning the inductance of the head, as mentioned above, it is possible to at least partially overcome the drooping characteristics caused by the width of the air gap. In addition in the circuit of FIGURE 3, the distributed capacitance of the transformer *Tr* may also be used for resonating with the total inductance in the circuit.

It should be possible to adjust the tuning for at least two reasons: Firstly, the inductance of the head W varies in manufacturing by as much as 25% and, secondly, the width of the gap of the head cannot be maintained with sufficient accuracy to carefully predetermine the best frequency at which the circuit should be tuned. Of course, it would be possible to provide a variable shunt capacitance, which is either continuously tunable or tunable in discrete steps, for adjusting the resonance point of the head W. However, this would be too expensive a solution, and it is almost impossible to provide a continuously adjustable capacitor in an extremely large size, such as, for example, 100,000 $\mu\mu f$.

The same results may be achieved in a simpler manner in accordance with the principles of this invention by connecting the tuning capacitor between one end of the reading head W and an adjustable tap on a resistor which is connected to the series feedback circuit. In this manner, the feedback signal may be utilized in determining the tuning effect of the capacitor, and its effect may be adjusted, thereby adjusting the effective capacitance of the circuit which shunts the reading head W. This may be accomplished by utilizing a potentiometer or other variable resistors in the series feedback path.

Figure 4:
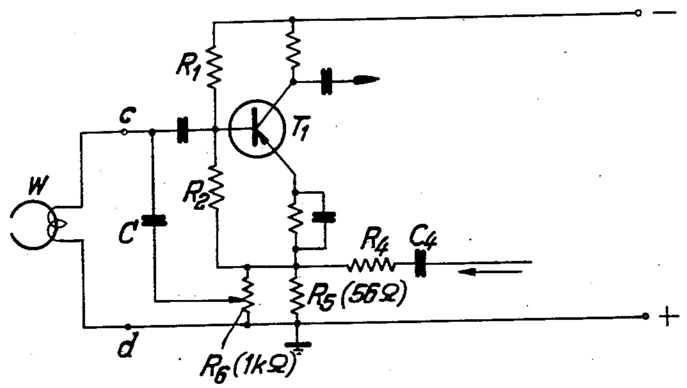
FIGURE 4 is a schematic circuit diagram of an amplifier input stage incorporating the principles of this invention.

A circuit embodying a means for tuning the impedance of the reading head is illustrated in FIGURE 4. The circuit provided for matching the impedance of the reading head W to the input impedance of the transistor $T_1$ is essentially the same as the circuitry of FIGURE 2. From a subsequent stage in the amplifier circuit, a feedback path which is effective primarily at the higher frequencies is connected to the input circuit of the transistor $T_1$ by the voltage divider comprising capacitor $C_4$, resistor $R_4$, and resistor $R_5$. In this way, the combined input impedance of the transistor $T_1$ and the resistances of the resistors $R_1$ and $R_2$ appears larger, looking from the reading head W, especially, at the higher frequencies.

In accordance with the statement made above, the top end of the capacitor C is connected to one side of the reading head W and the bottom end of the capacitor C is connected to a wiper arm on a potentiometer $R_6$, which is connected across the resistor $R_5$ between the feedback path and ground. As a result, a feedback signal of a selected amount is applied serially to the capacitor C to adjust its effect in tuning the inductance of the head W. Rather than using a resistor $R_5$, shunted by a potentiometer $R_6$ to which the capacitor C is connected, it is possible to substitute a single potentiometer for the resistor $R_5$.

However, this has not been provided in the circuit of FIGURE 4, since it is preferable that the resistor $R_5$ shall be a high quality precision resistor to serve in accurately determining the amount of feedback applied to the input of the transistor $T_1$, and potentiometers, having both low resistance values and small tolerances, are expensive and difficult to acquire. For this reason, the high value potentiometer $R_6$, shunted by a small fixed precision resistor $R_5$, is used to reduce the cost of the circuit.

It would appear that the insertion of at least a portion of the potentiometer $R_6$ into the resonant circuit formed by the capacitor C and the inductance of the head W would result in damping the tuned circuit. But tests have shown that such damping action is either not present or is not detrimental. This becomes clear when the relative impedances of the different components are considered. For example, the capacitor C may be 2,000 $\mu\mu f$., which amounts to about 8,000 ohms at 10 kilocycles, whereas the resistance of the parallel arrangement of the potentiometer $R_6$ and resistor $R_5$ is only 56 ohms when the wiper arm of $R_6$ is in its uppermost position; is approximately 264 ohms with the wiper arm of $R_6$ in its center position; and is reduced to zero when the wiper arm of $R_6$ is at its lowermost position.

Tests have also shown that, when the inductance of the head W is in the order of 107 mh., and the capacitance of the capacitor C is approximately 1,760 $\mu\mu f$., the resonant frequency of the circuit may be varied from 10 to 16 kilocycles with the values of the resistor $R_6$ being one kilo ohm and of the resistor $R_5$ being 56 ohms.

In a model having selectable tape velocities of approximately 3¾ inches per second, and 7½ inches per second, the circuit of FIGURE 4 was required only when the lower tape velocity was used, since at the higher tape speed, the decrease in the high frequency signal was so small, that the resonant frequency of the head itself was suitable, even though it was outside of the range of the device. Two capacitors were used, and one, having a value of 160 $\mu\mu f$., was inserted when the tape was driven at 7½ inches per second, whereas a capacitor having a value of 1,760 $\mu\mu f$. was switched into the circuit at the lower velocity of 3¾ inches per second.

We claim:

An amplifier for use with a magnetic reading head having a drooping output characteristic at the higher frequencies, said amplifier comprising, in combination: a first amplifier stage having a relatively low input impedance; means for connecting a magnetic reading head to the input of said first stage; at least a second amplifier stage having its input connected to the output of said first stage; feedback means forming a frequency-responsive feedback path from said second stage to the input of said first stage, said feedback path feeding a signal in series with the input of said first stage to increase the apparent input impedance of said first stage with increases in signal frequency, the amount of feedback signal being sufficient to compensate for the increasing impedance of the magnetic head with increasing frequency until there is attained a frequency of about 4 kc. at which the maximum frequency-dependent voltage across the magnetic reading head is reached, above which frequency of about 4 kc. the feedback signal remains constant, said fedeback means comprising a first voltage divider connected between the output of said second stage and ground, and a second voltage divider having one end connected to a source of voltage and the other end to a tap on said first voltage divider, the input to said first stage being connected to a tap on said second voltage divider; and tuning means connected across the input of said first stage for tuning a source connected thereto at frequencies near the upper limit of its frequency range, said tuning means being connected to an adjustable tap incorporated in said first voltage divider.

References Cited in the file of this patent

UNITED STATES PATENTS

| | | |
|---|---|---|
| 2,789,164 | Stanley | Apr. 16, 1957 |
| 2,791,645 | Bessey | May 7, 1957 |
| 2,794,076 | Shea | May 28, 1957 |
| 2,822,430 | Lin | Feb. 4, 1958 |
| 2,823,269 | Van Abbe et al. | Feb. 11, 1958 |
| 2,855,468 | Lohman | Oct. 7, 1958 |
| 2,919,313 | Johnson | Dec. 29, 1959 |

OTHER REFERENCES

Electrical Engineering, vol. 25, #307, pp. 358–364, published September 1953, cf. 179–171 MB.

"Electronics," April 1954, cf. 169–171, cf. 179–171 MB.